United States Patent [19]

Bueler

[11] 4,410,218

[45] Oct. 18, 1983

[54] CONTROL VALVE FOR TRACTOR REAR AXLES

[75] Inventor: Richard C. Bueler, Des Peres, Mo.

[73] Assignee: Echlin Inc., Branford, Conn.

[21] Appl. No.: 273,870

[22] Filed: Jun. 15, 1981

[51] Int. Cl.³ .................................................. B60T 8/26
[52] U.S. Cl. .................................... 303/6 C; 188/349; 303/7; 303/28
[58] Field of Search .............. 303/6 C, 6 R, 7, 28–30, 303/40, 9, 13, 50–56, 118; 137/627.5, 102; 188/349; 60/591

[56] References Cited

U.S. PATENT DOCUMENTS

| | | | |
|---|---|---|---|
| 3,183,042 | 5/1965 | Bueler | 303/54 X |
| 3,190,700 | 6/1965 | Fites | 303/7 |
| 3,771,836 | 11/1973 | Bueler | 303/6 C |
| 4,118,076 | 10/1978 | Mild | 303/6 C |
| 4,261,624 | 4/1981 | Plantan | 303/40 |
| 4,348,062 | 9/1982 | Koenig | 303/6 C |

*Primary Examiner*—Douglas C. Butler

*Attorney, Agent, or Firm*—Neuman, Williams, Anderson & Olson

[57] ABSTRACT

A valve for a tractor air brake system for changing the pressure delivered to air brakes on the rear axle depending on whether the trailor is attached or whether the tractor is operating in the "bob tail" mode. According to the invention, a rear axle ratio control valve provides an automatic selection of input to output ratio in accordance with the presence or absence of trailor emergency pressure. In the ratio control valve, service brake control pressure always acts against a first effective area of a piston for providing a first ratio of input to output. A second effective area of the piston receives pressure with the presence of the trailer emergency so that the ratio of pressure delivered from the valve will be changed. Further in accordance with the invention, a blend-back valve operates at a higher, predetermined pressure range, even when the pressure communication is closed by the absence of the emergency pressure to enable the valve to deliver the maximum pressure at high input pressure.

11 Claims, 3 Drawing Figures

CONTROL VALVE FOR TRACTOR REAR AXLES

The invention relates to a valve for a tractor air brake system for changing the pressure delivered to air brakes on the rear axle during "tractor only" operation.

As is well known, the braking torque of tractor axles must be sized to accommodate the braking requirements of a fully loaded tractor-trailer combination. The problem then arises that rear tractor axles having properly sized brakes to do the proportionate share of braking of the loaded combination are severely overbraked when the tractor is driven in the "tractor" only operation (hereinafter bobtail operation) so that there is a reduction of stopping controllability. The lack of controllability is due to the considerably lighter pedal effort required to skid the wheels rear axle when the tractor is in bobtail operation.

It is known to use the anti-lock braking systems for overcoming the problems of skid control of the tractor. However, such skid control devices are expensive and may not be required for many vehicle applications.

An object of the invention is to provide automatic means for reducing the pressure in the tractor rear brake cylinders during bobtail operation while still providing full pressure delivery capability when the trailer is attached.

A further object of the invention is to provide means to override the reduced pressure mode so as to allow full pressure delivery capabilities in those situations where increased braking torque is required even in the bobtail mode.

U.S. Pat. No. 3,190,700 issued June 22, 1965 to Fites and assigned to the assignee of the instant application shows a valve member disposed to the emergency push pull valve and the rear brake cylinders for providing a metering operation whenever there is no emergency pressure to the trailer and for disabling this metering operation whenever sufficient emergency air pressure exists in the emergency conduit of the trailer. This air ratio changing valve provides no isolation of the reservoir pressure and discloses no arrangement for a blending back of service brake pressure or override mode of operation.

According to the invention, a rear axle ratio control valve provides an automatic selection of input to output ratio in response to the presence or absence of trailer emergency pressure. A step bore piston is disposed in a step bore so that applied input service brake pressure always operates against a first area of the step bore piston. A second opposed area of the piston is in pressure communication with the metered output pressure of an independent pressure source, which metering operation is through a valve which is controlled by the position of the step bore piston. The first area is less than the second opposed area of the piston so that the metered output pressure is always in less than 1:1 proportion ot the input service brake pressure and corresponds to the proportion of these areas.

A third area of the step bore piston is such that pressure against it creates a force which is additive to that on the first area thereof. This third area is in pressure communication with the service brake input pressure through a check valve means. In accordance with the invention this check valve means is opened in response to pressure in the trailer emergency conduit. Whenever air pressure exists in the trailer emergency line, the check valve is opened to enable open fluid pressure communication between the service air pressure and the third area of the step bore piston. In this mode, the sum of the first and third areas is equal to that of the second opposed area of the stepped bore piston so that input to output ratio is 1:1.

In the bobtail mode, there is no pressure in the trailer emergency conduit so that the check valve means remains closed. Therefore a proportioned output pressure is delivered. At a particular input pressure, a blend back pressure is initiated to return the pressure ratio to 1:1. This blend back is accomplished by a valve member which initially opens at a selected service brake input pressure to meter input pressure to act against the third area of the step bore piston while the check valve means remains closed because there is no air in the emergency conduit.

Further features and advantages of the valve according to the invention will be seen from the accompanying drawings and description in which.

Figure 1:
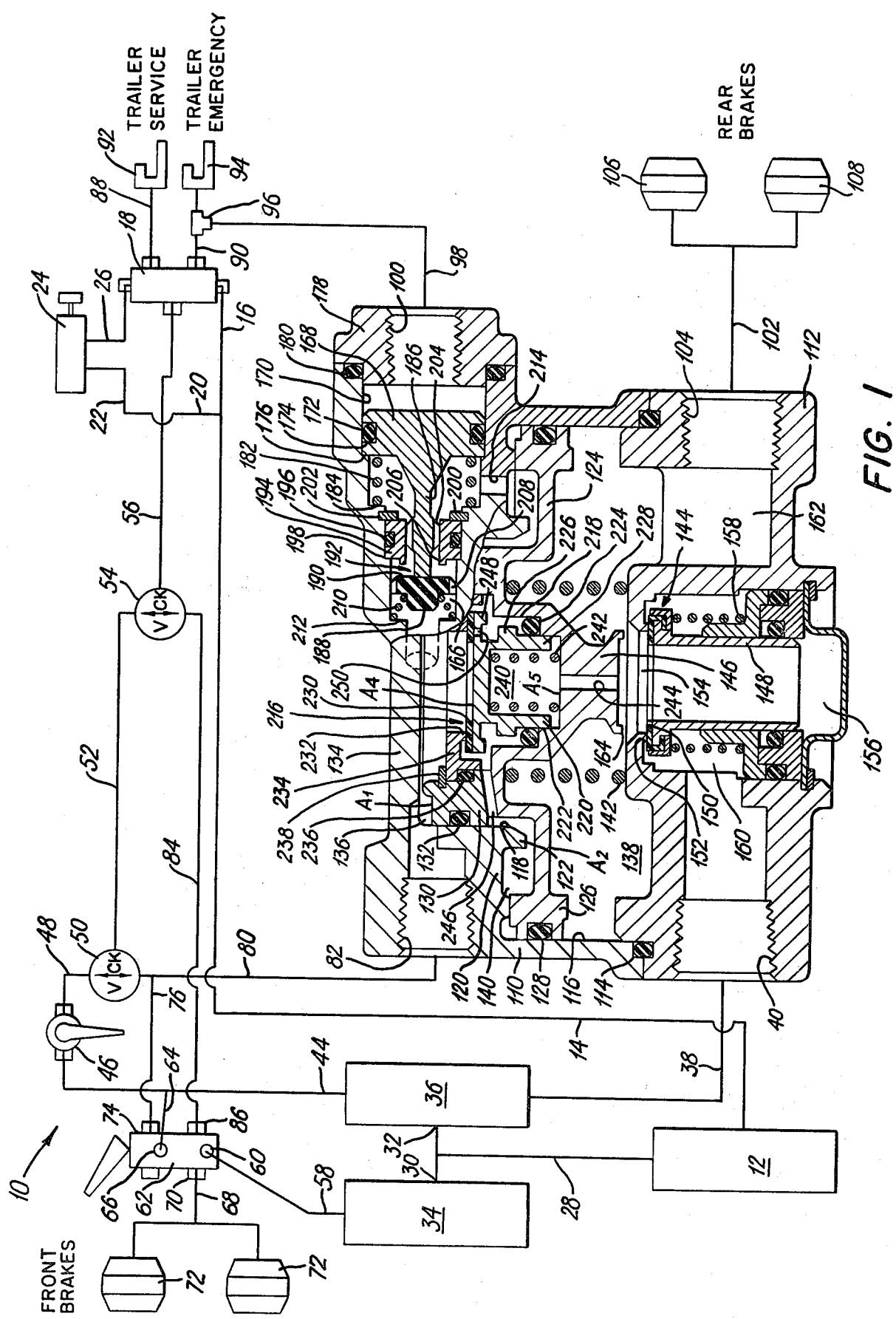
FIG. 1 is a schematic of a tractor braking system incorporating a valve in accordance with the invention shown in a sectional elevation.

In FIG. 1, an air brake system incorporating a valve according to the invention is shown generally at 10. Fluid reservoir tank 12 receives presure from a suitable compressor (not shown). Outlet conduit 14 is connected through a branch conduit 16 to the tractor emergency pressure input port of tractor protection valve 18. The other branch conduit 20 from conduit 14 is connected to the inlet port 22 of the trailer emergency brake valve (push-pull) 24 whose outlet conduit 26 is connected to the control port of trailer protection valve 18.

The reservoir tank 12 forms the so-called "wet tank" having a separate outlet conduit 28 connected to input ports 30 and 32 of dry reservoir tanks 34 and 36, respectively.

Outlet conduit 38 is connected from dry reservoir tank 36 to inlet port 40 of the valve 42 further described below. An independent outlet conduit 44 is connected between reservoir 36 and the inlet port of conventional brake hand valve 46. Outlet conduit 48 is connected between the outlet of valve 46 and one end of two-way check valve 50. Conduit 52 is connected between the outlet port of check valve 50 and input port of a second two-way check valve 54. Conduit 56 leads from the outlet port of check valve 54 to the tractor service port of trailer protection valve 18.

Outlet conduit 58 leads from reservoir tank 34 to first inlet port 60 of a conventional brake valve such as treadle application valve 62. A branch 64 from conduit 44 is connected to second inlet port 66 of treadle application valve 62. Conduit 68 is connected between service brake outlet port 70 and the front brake cylinders 72. From the primary delivery port 74, conduit 76 is "tee'd" into a first branch conduit 78 connected to the second input port of two-way check valve 50 and branch conduit 80 connected to the control port 82 of ratio valve 42. Conduit 84 leads from the secondary delivery port 86 of treadle application valve 62 to the second inlet port of two-way check valve 54.

From tractor protection valve 18, conventional trailer service conduit 88 and trailer emergency conduit 90 lead to glad hands 92 and 94 respectively which are adapted to meet with corresponding trailer connectors (not shown).

The operation of the tractor protection valve 18 is well known and will not be described in detail except to point out that whenever the tractor is operating in the bobtail condition, there is no fluid pressure in conduit 90 since the tractor protection valve 18 closes to isolate the trailer service and emergency conduits 88 and 90 from the reservoir 34, 36 and 12.

The tee 96 is connected into the trailer emergency conduit 90 so that conduit 98 may be connected from conduit 92 to the trailer signal port 100 of valve 42. Delivery pressure outlet conduit 102 is connected from delivery brake pressure outlet port 104 of valve 42 of rear brake chambers 106 and 108.

Still referring to FIG. 1, the ratio control valve 42 comprises an upper valve body portion 110 suitably affixed to a lower valve body portion 112 and hermetically sealed by, for instance, O-ring 114. The upper valve body portion 110 has a large bore 116 joined to an upper smaller bore segment 118 at a shoulder portion 120. Suitably, the shoulder 120 has an extension 122 which continues the inner circumference of small bore 118 into the chamber of the larger bore portion 116.

A step reaction piston 124 is disposed in the step bore 116, 118. Flange 126 of the reaction piston 124 abuts the walls of bore 116 and is slidingly sealed thereon by means such as O-ring 128. Smaller body portion 130 of the reaction abuts the walls of the smaller bore 118 and is slidingly sealed thereon by means such as O-ring 132.

The body portion 130 of the reaction piston 124 defines between itself and the top 134 of the upper portin 110, a chamber 136 in which fluid pressure therein acts downwardly on reaction piston 124 against an effective area A1.

The reaction piston 124 defines between itself and the lower valve body portion 112 a chamber 138 such that pressure in chamber 138 will act in an upward direction against the reaction piston 124 on an effective area A2.

A third chamber 140 is defined between the walls of small bore 118 and a large bore 116 and the reaction piston seals 128 and 132. Pressure in this third chamber 140 will act downwardly against an effective area A3 equal to the difference between A2 and A1.

Piston return spring 142 is disposed between the reaction piston 124 and the lower valve portion 112 to return the reaction piston 124 to its uppermost position in the absence of pressure thereon. A conventional inlet-exhaust valve 144 is disposed in the lower valve portion 112 to be operated by engagement of an extension 146 of the reaction piston 124. The inlet-exhaust valve 144 comprises a hollow tube member 148 having a resilient seal member 150 normally sealingly abutting shoulder 152. The hollow tube 148 is in fluid communication with chamber 138 through orifice 154 so that the chamber 138 is normally exhausted through orifice 154, tube portion 148, and exhaust outlet 156. Return spring 158 assures that the resilient member 150 normally remains seated against shoulder (valve seat) 152.

Fluid pressure inlet port 40 is in pressure communication with chamber 160 surrounding the inlet-exhaust valve 144. Outlet port 104 is in fluid pressure communication with chamber 138 through a smaller chamber segment 162. Upon application of braking pressure reaction piston 124 moves downwardly so that lip 164 of extension 146 engages the resilient seal 150 of inlet-exhaust valve 144 so as to seal chamber 138 from the exhaust path through the valve 144.

Further downward movement of the piston 124 compresses spring 158 to allow fluid pressure from inlet valve 40 to enter chamber 138 from whence it is transmitted through small chamber 162 to outlet port 104 and from thence through conduit 102 to rear brake chambers 106 and 108.

In the top portion 110 of valve 42, inlet port 82 is in pressure communication with valve chamber 136 so that fluid pressure in conduit 80 is operative to act against upper piston body portion 130.

A stepped bore 166 extends from inlet port 100 to chamber 136. Emergency signal piston 168 is disposed in large bore portion 170 and is sealed therein by means such as O-ring 172 in annular slot 174. The piston 168 is enabled to move between two positions, one abutting shoulder 176 and in the other opposed direction against cap 178 sealed by means such as O-ring 180. Spring 182 is disposed in compression between shoulder 184 of stepped bore 166 and piston 168.

Stem 186 extends from piston 168 and has at the end thereof nearest chamber 136 a protruding member 188 abutting a resilient member 190 forming one part of a check valve arrangement generally denoted by numeral 192. An annular member 194 having an inner diameter slightly larger than the main diameter of stem 186 is disposed in the stepped bore 166 between the piston 168 protuberance 188. Annular member 194 is hermetically sealed at its outer diameter by means such as O-ring 196 and held against shoulder 198 by holding means, suitably snap ring 200 in slot 202. Suitably stem 186 has an enlarged portion with bosses 204 for guiding the stem in the inner circumference of annular member 194 and for allowing fluid pressure from chamber 136 to flow through the bore of annular member 194. Suitably, annular member 194 has an annular lip 206 thereon for sealingly engaging abutment of resilient member 190 whenever check valve 192 is moved to the closed position.

Suitably, resilient member 190 has a plurality of bosses 208 thereon for slidingly engaging the walls of the stepped bore 166 for guiding of the resilient member 190 and allowing fluid pressure to pass whenever check valve 192 is open. Preferably, spring 210 is disposed in compression between shoulder 212 and resilient member 190 to assure complete sealing of the check valve 192. A small cross bore 214 allows fluid communication between bore 166 and chamber 140.

In accordance with the invention, a blend-back valve shown generally at 216 is disposed between chamber 136 and chamber 140, conveniently within the piston 124. The upper portion 130 of piston 124 has a stepped bore 218 therein. Piston 220 is disposed to slide along the walls of bore segment 222 and is sealed therein by means such as O-ring 224 between shoulder 226 and downwardly extending flange 228 of piston 220. The upper portion of piston 220 has a resilient sealing means 230 at the top thereof suitable for sealingly engaging annular lip (valve seat) 232 of annular member 234 also sealed at its outer circumference by O-ring 236. The annular member 234 is held in place, conveniently, by snap ring 238.

Conveniently, the piston 220 has a hollow chamber 240 therein in which spring 242 is disposed in compression to bias piston 220 upwardly for sealing engagement of resilient member 230 with lip (valve seat) 232.

Small bore 244 extends downwardly from chamber 240 through extension 146. It will be appreciated that the small bore 244 will always be in communication with atmospheric pressure since in the upward position illustrated, the chamber 138 is exhausted to atmosphere and in the downward position where lip 164 is in sealing engagement with seal 150, bore 244 remains open to atmospheric pressure through hollow tube 148 and exhaust port 156.

A small cross bore 246 provides fluid pressure communication between chamber 136 and chamber 140 whenever blendback valve 216 is in the open position. Preferably, the upper portion of piston 220 has a lip 248 having a plurality of small bores 250 therein disposed directly beneath resilient seal 230. According to the invention, these holes 250 are normally sealed by downward sealing pressure on sealing member 230. However, whenever pressure in chamber 140 is greater than the pressure in chamber 136, the pressure in chamber 140 will exhaust up through the small holes 250 and into chamber 136 since the upward pressure on resilient member 230 causes it to act as a flapper valve.

The operation of the valve 42 when the trailer is joined to the tractor will now be described. When the trailer connections (not shown) are made at 92, 94 and when there is appropriate pressure in reservoir bank 12, valve 24 is opened to allow the full tank pressure into conduit 90 and thereby from tee 96 through conduit 98 to the emergency pressure signal port 100 of valve 42. The full pressure acts against piston 186 to drive it leftward as illustrated in FIG. 1. Accordingly, check valve 192 is in the open position to allow open fluid communication between chamber 136 and chamber 140 through stepped bore 166 and small bore 214.

When braking pressure is supplied to conduit 76 from application valve 62, service pressure flow through conduit 80 to service control port 82 and thence to chamber 136. Since there is open communication between chamber 136 and 140, service brake pressure also enters chamber 140 and the control pressure from the application valve 62 acts on the total upper area of piston 124 [A1+(A2−A1)] the effective area of which is equal to the effective area of A2.

As noted in the description of the figures, the area of the piston acted upon by pressure in chamber 138 opposing the downward force on piston 124 is the effective area A2 and pressure in chamber 138.

The service air pressure entering through control port 82 first acts to force piston 124 downward so that lip 164 will seat on resilient member 150 to seal off the exhaust port of the inlet-exhaust valve 144. Further downward movement of piston 124 opens inlet valve portion 150, 152, allowing reservoir pressure from tank 36 to enter through inlet port 40 to chamber 138 and from thence to outlet port 104 in conduit 102 to the rear brakes 106 and 108. The pressurized fluid entering chamber 138 acts on the total area A2 of the lower portion of piston 124 so as to return the piston upwardly until the inlet valve portion 150, 152 is closed. The inlet-exhaust valve will remain in the lapped position (that is poised for movement in either direction) for as long as the piston remains in a force balanced condition.

Figure 3:
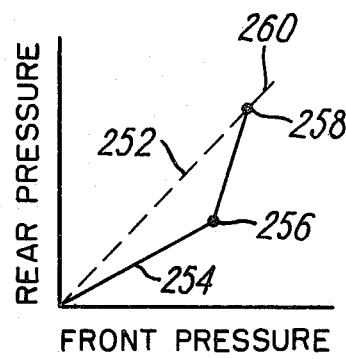
FIG. 3 is a graphical representation of the pressure ratio of the front to rear brake pressure.

Since the control pressure acting downwardly on piston 124 in chambers 136 and 140 acts on an area [A1+(A2−A1)] and is opposed by pressure in chamber 138 acting on an equal opposed area A2, the force balanced position results in a 1:1 relationship of $P_{out}=P_{in}$. The pressure to the front brakes 72 is also metered in conventional manner directly from the reservoir tanks 34 or 36 in a 1:1 relationship through the brake application valve 62. As shown in FIG. 3, when the trailer emergency signal is present, i.e. when there is a air pressure available at port 100, the graph of rear brake pressure to front brake pressure is the straight line 252 of FIG. 3. Thus, the tractor has full 1:1 air pressure available to the tractor front brakes and also to the tractor rear brakes so long as the trailer is connected and there is trailer emergency pressure available.

The operation of valve 42 when the trailer is disconnected, i.e. the tractor is in "bobtail" operation, will now be described. In the bobtail mode, push-pull valve 24 is closed so that there is no pressure at the control port of tractor protection valve 18. As is well known, the tractor protection valve in this case isolates the conduits 88 and 90 from the conduit 56 and 16. In this mode there is no longer air pressure available to the trailer emergency signal port 100 of valve 42. Accordingly, there is no pressure on piston 168 to apply force to open the check valve 192. Spring 182 biases piston 168 against cap 178 to close check valve 192 and therefore to close off communication between chamber 136 and 140 through small bore 214. Now when pressure from the tractor or application valve 62 enters chamber 136 through port 82, the pressure acts only on the reduced area A1 of the central upper body portion of piston 124. As before, the pressure in chamber 136 acts to force the piston down so that lip 164 seats on resilient member 150 to seal off the exhaust port. As described previously, further downward movement of the piston 124 opens the valve 150, 152 to allow the pressure from tank 36 to enter chamber 138. However, in this case, the pressure in chamber 136 is acting on the smaller area A1 whereas the pressure in chamber 138 is still acting against the larger total area A2 of the stepped bore piston 124 acting to return the piston and to close inlet valve 150, 152. The force balance in this case results initially in the relationship:

$$P_{out}=P_{in}(A1/A2)$$

where $P_{in}$ is the pressure at port 82 and $P_{out}$ is the delivered pressure at port 104. Again the front brakes are being pressurized in 1:1 proportion but pressure to the rear brakes of the tractor is less than a 1:1 proportion as determined by the difference between the large area A2 and the smaller area A1. As a result, the relationship of rear brake pressure to front pressure in this condition is illustrated by the line 254 in the graph of FIG. 3.

This relationship will exist until the pressure in chamber 136 becomes sufficient to open blend-back valve 216. In FIG. 3, the point at which the blend valve 216 opens is represented at point 256.

The force at which the valve 216 will open is determined by the input pressure in chamber 136 operating against an effective area A4 shown in FIG. 1 and is opposed by the force of spring 242 which may be set at any desired rate for controlling the actual input pressure at which the valve 216 will open.

Whenever the valve opens, a pressure $P_B$ is admitted into chamber 140. The pressure $P_B$ in this chamber will act to aid the spring force of spring 242 in attempting to close the valve 216. The pressure $P_B$ acts against an effective area which is the difference between area A4 and the area A5 of the piston 220 at the seal 226. Therefore, the relationship controlling the metering of pressure into chamber 140 is given by the equation:

$$P_B(A4-A5)+F_S=P_{in}A4$$

so that $$P_B = (P_{in}A4 - F_s)/(A4 - A5)$$

The admittance of pressurized air into chamber 140 will change the ratio of $P_{out}/P_{in}$ as follows:

$$P_{out} = (P_{in}A1 + P_B(A2 - A1))/A2$$

wherein $P_B$ equals the pressure in chamber 140. This relationship will continue to exist until $P_B$ becomes equal to $P_{in}$. It will be appreciated that the pressure $P_B$ can never rise above the input pressure $P_{in}$ so that between point 256 and point 258, the rear brake pressure rapidly increases in accordance with the above equation and thereafter the pressure in both chamber 136 and chamber 140 will be equal to $P_{in}$. Thus, as previously shown, thereafter the ratio of output pressure to input pressure to the rear brakes will be substantially 1:1, since above this point the pressure $P_{in}$ acting downward on effective area A5 is always greater than the force $F_S$ of spring 242 so that valve 216 remains open and there is no further metering of pressure through the blend valve 216.

When the service control pressure is exhausted from chamber 138 and check valve 192 is open, chamber 140 is exhausted through bore 214 past check valve 192 to chamber 138. However, when check valve 192 is closed, the exhaust path through bore 214 is also closed. Accordingly, an alternate pathway is provided. As previously described, this pathway is through the plurality of holes 250 in lip 248. Whenever the pressure in chamber 140 is greater than the pressure in chamber 138, resilient member 230 will lift to allow the egress of fluid pressure from chamber 140 to chamber 138 through the holes 250.

It will occur to a person skilled in this art that because spring 182 is disposed between shoulder 184 and piston 168, the pressure required to hold check valve 192 in the open position must be slightly greater than the pressure required to close it. That is, when the pressure in chamber 140 approaches the pressure at port 100, check valve 192 will close. The closing of the check valve, all other things being equal, would mean that further input pressure would not be transmitted to chamber 140 so that the valve would start to ratio in proportion to the changed ratio of effective areas as previously described. However, it will be appreciated that the closing of valve 192 will normally not be a problem since first of all, the braking input pressure will rarely, if ever, approach such as value because all wheels would tend to lock at such pressures. Secondly, in the embodiment shown in FIG. 1, the blend valve 216 will always be opened at such higher values of input prressure to provide communication between chamber 138 and 140.

Figure 2:
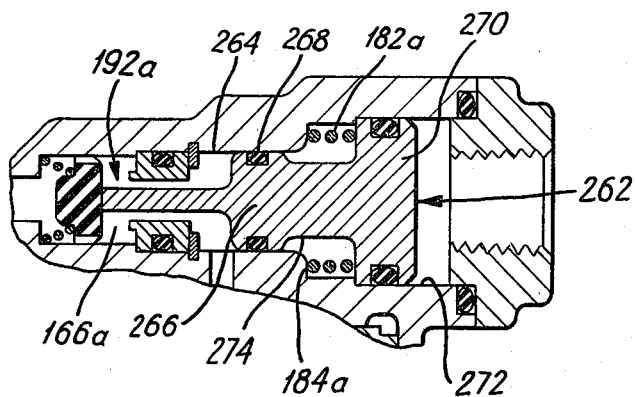
FIG. 2 is an alternate check valve arrangement.

However, there may be instances where the closure of valve 192 might be disadvantageous, particularly where there is no blend-back capability. Referring now to FIG. 2, an alternative emergency signal piston assembly is shown. In FIG. 2, the parts of the assembly corresponding to similar parts in FIG. 1 are labelled with a "small a" following the number. The elements and operation of check valve 192a to enable fluid pressure communication through step bore 166a is similar to that previously described. The difference here is that in place of piston 168, stepped piston 262 is disposed in stepped bore 166a. A segment 264 of the bore 166a is elongated to accommodate the travel of smaller piston portion 266 which is slidingly sealed in bore segment 264 by annular seal 268. Large piston portion 270 corresponding to piston 168 of FIG. 1 is sealed in the larger bore portion 272. Annular slot 274 formed between piston portions 266 and 270 accommodates return spring 182a between shoulder 184a and large piston portion 270. It is evident that because of the stepped piston 262 having a greater area exposed to the signal pressure at port 100, the check valve 192a will not close even when the pressure on both sides of piston 262 approach the same value.

It will be understood that the claims are intended to cover all changes of the preferred embodiments herein chosen for the purpose of illustration which do not constitute departures from the scope and spirit of the invention.

What is claimed is:

1. A valve for a brake system comprising:
   (a) a housing having a cavity therein;
   (b) a reaction piston slidingly and sealing disposed in said cavity;
   (c) said reaction piston having first and second surfaces thereon defining a first effective area and a second opposed effective area thereof;
   (d) said reaction piston having a third surface defining a third effective area of said reaction piston;
   (e) a first chamber of said cavity being adapted to receive a first fluid pressure for application to said first effective area;
   (f) a second chamber in said housing being adapted to receive and deliver a second fluid pressure and to apply said second fluid pressure to said second opposed effective area;
   (g) a third chamber in said cavity being adapted to receive fluid pressure for application to said third effective area;
   (h) means for controlling the admission and exhaustion of said second fluid pressure from said second chamber in accordance with a displacement of said reaction piston; and
   (i) pressure responsive means for responding to a third pressure thereon for controlling the communication of said first fluid pressure to said third chamber and for controlling the ratio of said second fluid pressure to said first fluid pressure in accordance with said third pressure.

2. The valve of claim 1 wherein said second opposed effective area is substantially equal to the sum of said first effective area and said third effective area.

3. The valve of claim 1 wherein said pressure responsive means comprises:
   (a) a communicating bore between said first chamber and third chamber;
   (b) valve means comprising a valve seat and a movable valve head disposed in said communicating bore for opening and closing fluid pressure communication between said first and third chambers; and
   (c) piston means operative for receiving said third pressure on one side thereof for displacement of said piston means, said piston means being connected to said movable valve head whereby said valve means is open and closed in accordance with the position of said piston means.

4. The valve of claim 3 wherein said piston means is a stepped piston having a large end portion and a smaller end portion slidingly and sealingly disposed in a corresponding stepped bore and wherein said third pressure is applied to said large end portion.

5. The valve of claim 1 further comprising blend valve means for metering pressure to said third chamber when said first pressure is above a predetermined pressure whereby at a second higher predetermined pressure the ratio of said second pressure to said first pressure will be the same regardless of the position of said pressure responsive means.

6. The valve of claim 5 wherein said blend valve means comprises a blend chamber in said reaction piston, said blend chamber being in pressure communication with said first chamber, and valve means disposed between said first chamber and said blend chamber for controlling fluid communication between said first chamber and said blend chamber.

7. A valve for a brake system comprising:
   (a) a housing having a stepped cavity therein;
   (b) a step-reaction piston sealingly disposed in said cavity;
   (c) said cavity having stepped wall portions for sealingly abutting said step-reaction piston wherein said step-reaction piston defines within said cavity:
      (i) a first chamber in said housing, said first chamber being adapted to receive a first fluid pressure and wherein said first fluid pressure is applied to a first effective area of said step-reaction piston to create a first force;
      (ii) a second chamber in said housing, said second chamber being adapted for applying fluid pressure to a second opposed effective area of said reaction piston to create a second force, the force against the reaction piston from pressure on said second effective area being opposed to the force on said first effective area; and
      (iii) a third chamber in said housing, said third chamber being adapted for applying fluid pressure to a third effective area in said piston to create a third force which acts in the same direction as said first force and wherein said second opposed effective area is substantially equal to the sum of said first and said third effective areas;
   (d) said stepped reaction piston being operative to open and close an inlet-exhaust valve in said second chamber in accordance with the position of said stepped reaction piston; and
   (e) pressure responsive valve means for controlling the comunication of said first fluid pressure to said third chamber in accordance with a third pressure and for controlling the ratio of pressures for force balancing of said stepped reaction piston in accordance with said third pressure.

8. A valve for a brake system comprising:
   (a) a housing having a cavity therein;
   (b) a reaction piston slidingly and sealingly disposed in said cavity;
   (c) said reaction piston having first and third surfaces thereon defining first and third respective areas thereof;
   (d) said reaction piston having a second opposed surface thereon defining a second opposed effective area of said reaction piston;
   (e) a first chamber of said cavity being adapted to receive a first fluid pressure for application to said first effective area;
   (f) a second chamber in said cavity being adapted to receive and deliver a second fluid pressure and for applying the second fluid pressure therein to said second opposed effective area;
   (g) a third chamber in said housing being adapted to receive fluid pressure for application to said third effective area;
   (h) means for controlling the admission and exhaustion of said second fluid pressure from said second chamber in accordance with a displacement of said reaction piston;
   (i) pressure responsive means for responding to a third pressure thereon for controlling the communication of said first fluid pressure to said third chamber and for controlling the ratio of said second fluid pressure to said first fluid pressure in accordance with the value of said third pressure, said pressure responsive means comprising:
      (1) a communicating bore between said first chamber and third chamber;
      (2) valve means comprising a valve seat and a movable valve head disposed in said communicating bore for opening and closing fluid pressure communications between said first and third chambers; and
      (3) piston means operative for receiving said third pressure on one side thereof for displacement of said piston means, said piston means being connected to said movable valve head whereby said valve means is open and closed in accordance with the position of said piston means.

9. A valve for a brake system comprising:
   (a) a housing having a cavity therein;
   (b) a reaction piston slidingly and sealingly disposed in said cavity;
   (c) said reaction piston having first and second surfaces thereon defining a first effective area and a second opposed effective area thereof;
   (d) said reaction piston having a third surface thereon defining a third effective area of said reaction piston;
   (e) a first chamber of said cavity being adapted to receive a first fluid pressure for application to said first effective area;
   (f) a second chamber in said housing being adapted to receive and deliver a second fluid pressure and apply the second fluid pressure to said second effective area;
   (g) a third chamber to said cavity being adapted to receive fluid pressure and for applying the fluid pressure therein to said third effective area;
   (h) means for controlling the admission and exhaustion of said second fluid pressure from said second chamber in accordance with a displacement of said reaction piston;
   (i) pressure responsive means for responding to a third pressure thereon for controlling the communication of said first fluid pressure to said third chamber and for controlling the ratio of said second fluid pressure to said first fluid pressure in accordance with the value of said third pressure, said pressure responsive means comprising:
      (1) a communicating bore between said first chamber and third chamber;
      (2) valve means comprising a valve seat and a movable valve head disposed in said communicating bore for opening and closing fluid pressure communication between said first and third chambers;
      (3) piston means operative for receiving said third pressure on one side thereof for displacement of said piston means, said piston means being connected to said movable valve head whereby said valve means is open and closed in accordance with the position of said piston means; and (j) a valve means for metering pressure to said third chamber when said first pressure is above a predetermined pressure so that at a second higher predetermined pressure the ratio of said second pressure to said first pressure will be the same regardless of the position of said pressure responsive means.

10. A ratio control valve for tractor rear axles comprising:
    (a) a housing having a first stepped bore;
    (b) a stepped reaction piston having first and second stepped portions thereon;
    (c) said first stepped portion being slidingly sealed in a first portion of said stepped bore to define a first chamber with said stepped piston having a first effective area therein;
    (d) said second stepped portion of said stepped piston being slidingly sealed in a corresponding portion of said stepped bore, said second stepped portion defining thereby a second chamber defining therein a second opposed effective area;
    (e) said second stepped portion of said stepped reaction piston also having a third surface defining a third area concentric with said first surface and associated with a third chamber in said first bore;
    (f) said first chamber being connected to receive service brake control air pressure;
    (g) said second chamber having an inlet exhaust valve controlled by displacement of said stepped reaction piston for admitting metered air pressure from an independent source into said second chamber and for exhausting air pressure therefrom;
    (h) a second stepped bore having a trailer signal piston disposed therein;
    (i) a first end of said second stepped bore being in fluid communication with said first chamber;
    (j) a valve seat disposed in said bore for seating engagement with a movable valve member, said movable valve member being connected to a first side of said piston for movement therewith between an open position away from said valve seat and a closed position, sealingly abutting said valve seat;
    (k) a communicating bore between said third chamber and said second stepped bore opening into a wall of said second stepped bore located between said valve seat and said piston whereby said first chamber and said third chamber are in open fluid communication when said valve member is in the open position; and
    (l) a second opposed end of said second stepped bore being connected to receive trailer emergency air pressure whereby the trailer emergency air pressure controls the position of said trailer signal piston and thereby the position of said valve member.

11. A ratio control valve for tractor rear axles comprising:
    (a) a housing having a first stepped bore;
    (b) a stepped reaction piston having first and second stepped portions thereon;
    (c) said first stepped portion being slidingly sealed in a first portion of said stepped bore to define a first chamber with said stepped piston having a first effective area therein;
    (d) said second stepped portion of said stepped piston being slidingly sealed in a corresponding portion of said stepped bore, said second stepped portion defining thereby a second chamber defining therein a second opposed effective area;
    (e) said second stepped portion of said stepped reaction piston also having a third surface to define a third area concentric with said first surface associated with a third chamber in said first bore;
    (f) said first chamber being connected to receive service brake control air pressure;
    (g) said second chamber having an inlet exhaust valve controlled by displacement of said stepped reaction piston for admitting metered air pressure from an independent source into said second chamber and for exhausting air pressure therefrom;
    (h) a second stepped bore having a trailer signal piston disposed therein;
    (i) a first end of said second stepped bore being in fluid communication with said first chamber;
    (j) a valve seat disposed in said bore for seating engagement with a movable valve member, said movable valve member being connected to a first side of said piston for movement therewith between an open position away from said valve seat and a closed position, sealingly abutting said valve seat;
    (k) a communicating bore between said third chamber and said second stepped bore opening into a wall of said second stepped bore located between said valve seat and said piston whereby said first chamber and said third chamber are in open fluid communication when said valve member is in the open position;
    (l) a second opposed end of said second stepped bore being connected to receive trailer emergency air pressure whereby the trailer emergency air pressure controls the position of said trailer signal piston and thereby the position of said valve member; and
    (m) a blend valve means comprising a blend chamber in said reaction piston, said blend chamber being in pressure communication with said third chamber, and valve means disposed between said first chamber and said blend chamber for controlling fluid communication between said first chamber and said blend chamber.

* * * * *